United States Patent [19]
Feigel et al.

[11] Patent Number: 5,954,162
[45] Date of Patent: Sep. 21, 1999

[54] COMBINED SERVICE AND PARKING BRAKE

[75] Inventors: Hans-Jorg Feigel, Rosbach; Peter E. Rieth, Eltville, both of Germany

[73] Assignee: ITT Manufacturing Enterprises Inc., Wilmington, Del.

[21] Appl. No.: 08/875,541

[22] PCT Filed: Jan. 25, 1996

[86] PCT No.: PCT/EP96/00291

§ 371 Date: Sep. 25, 1997

§ 102(e) Date: Sep. 25, 1997

[87] PCT Pub. No.: WO96/23685

PCT Pub. Date: Aug. 8, 1996

[30] Foreign Application Priority Data

Jan. 31, 1995 [DE] Germany .................... 195 02 927

[51] Int. Cl.$^6$ .................................................. F16D 5/26
[52] U.S. Cl. .................. 188/72.6; 188/265; 188/72.5
[58] Field of Search ................... 188/72.6, 265, 188/72.5, 72.4, 353

[56] References Cited

U.S. PATENT DOCUMENTS

| | | | |
|---|---|---|---|
| 3,874,747 | 4/1975 | Case et al. | 188/265 |
| 4,116,113 | 9/1978 | Leclerc | 188/265 |
| 4,116,307 | 9/1978 | Reainecke | 188/106 P |
| 4,212,167 | 7/1980 | Pruett . | |
| 4,215,767 | 8/1980 | Shirey | 188/106 P |
| 4,412,603 | 11/1983 | Bischoff | 188/106 P |
| 4,873,824 | 10/1989 | Cox | 188/265 |

FOREIGN PATENT DOCUMENTS

| | | |
|---|---|---|
| 2 368 390 | 5/1978 | France . |
| 2422167 | 11/1975 | Germany . |
| 27 08 629 | 8/1978 | Germany . |
| 2937853 | 4/1980 | Germany . |
| 3518715 | 11/1986 | Germany . |
| 3518716 | 4/1987 | Germany . |
| 37 32 303 | 4/1989 | Germany . |
| WO 96/23685 | 8/1996 | WIPO . |

*Primary Examiner*—Robert J. Oberleitner
*Assistant Examiner*—Robert A. Siconolfi
*Attorney, Agent, or Firm*—Rader, Fishman & Grauer PLLC

[57] ABSTRACT

A combined service and parking brake includes a hydraulic actuating device (1) which has a brake cylinder (2) and a brake piston (3), and a hydraulically operable locking device (8) for fixing the brake piston (3) in the applied condition. According to the present invention, the locking device (8) is operable by a pressure impact through the hydraulic supply line (5) provided for service brake operations, and the pressure impact is in a pressure range that is above the pressure range provided for service brake operations.

5 Claims, 1 Drawing Sheet

COMBINED SERVICE AND PARKING BRAKE

BACKGROUND OF THE INVENTION

The present invention relates to a combined service and parking brake, in particular for automotive vehicles.

A combined service a nd parking brake is disclosed in German patent application No. 37 32 303. The prior art brake has a hydraulic actuating device configured as a brake cylinder with two brake pistons which are movable in opposite directions. The brake cylinder is connected to the remaining brake system of a vehicle by way of a first hydraulic supply line. A second hydraulic supply line leads to a hydraulically operable locking device in the form of an auxiliary cylinder arranged at right angles relative to the brake cylinder. The auxiliary cylinder has an auxiliary piston adapted to slide a wedge between the two first-mentioned brake pistons in the brake cylinder in order to lock the two brake pistons in the applied condition. The disadvantage of the prior art arrangement is that two hydraulic supply lines are necessary for each brake. This increases the expenditure in material and assembly to a considerable extent.

Also, combined service and parking brakes are known in which a hydraulic actuating device is provided for service brake operations and mechanically operable locking devices are provided as parking brakes. However, the disadvantage of arrangements of this type is that an additional brake cable is required for each brake beside the hydraulic supply line. Further, this necessitates an increased expenditure in material and manufacture. In addition, the brake cable can only be fitted subsequent to mounting the brake on the vehicle. Normally, the assembly is not carried out by any competent brake manufacturer but is generally done by car makers. Apart from the shortcoming of an increased assembly effort, car makers additionally bear the risk of a wrong assembly.

SUMMARY OF THE INVENTION

An object of the present invention is to simplify a combined service and parking brake with respect to the operation of the locking device to the effect of reducing in particular the effort needed for the assembly of the brake on the vehicle.

This object is achieved by using the same hydraulic supply line for operation of the service brake and for operation of the locking device and achieving the separation in terms of functions by selecting different pressure ranges for the different functions.

In a preferred aspect of the present invention, the hydraulic pressure for service brake operations is in the range of 0 to 150 bar, while a pressure impact in the range of more than 200 bar is required for the operation of the locking device. In other respects, the hydraulic pressure for service brake operations lies in the conventional range so that no modification to the brake system is necessary.

To prevent inadvertent release of the locking device, the brake piston is adapted to be locked relative to the brake cylinder by mechanical locking means. However, locking the brake piston relative to the brake cylinder by frictional engagement is also within the scope of the present invention.

In a preferred aspect of the present invention, the locking means of the locking device are operable by a hydraulic auxiliary piston. The auxiliary piston has a considerably smaller cross-sectional surface than the brake piston so that a high amount of hydraulic pressure is required to generate the actuating forces for the actuation of the locking means. Besides, the auxiliary piston can be acted upon by a resetting spring in opposition to the actuating direction.

A resetting spring of this type is particularly favorable in connection with the preferred aspect that the auxiliary piston is moved by a first pressure impact in the actuating direction, and the movement is transmitted to the locking means by way of a mechanical transmission device which has an accumulator function. The locking means cause locking engagement between the brake piston and the brake cylinder. After the pressure impact, the auxiliary piston returns to its initial position by the action of the resetting spring, while the mechanical accumulator retains the locking means in their locked position. During a second pressure impact, the auxiliary piston moves again in the actuating direction and acts on the mechanical device which is now returned to the original operating condition. The locking means are released. The brake piston is again freely movable in the brake cylinder and can return to its initial position. This is done after the second pressure impact when the hydraulic pressure has declined completely. Thereafter, the auxiliary piston will also return to its initial position, and the locking device is ready for continued operation.

In a first embodiment of the locking device, the locking means are configured as latches which are distributed over the periphery of the brake piston. The latches are engaged in an internal toothing in the brake cylinder bore.

In a second embodiment, the locking means can also be arranged at the open end of the brake cylinder in the area of the end surface of the brake piston. The advantage of an arrangement of this type is that there is no need for additional manufacturing provisions on the brake cylinder. In particular, there is no need for an internal toothing arrangement.

The pressure impact necessary for the operation of the locking device can be generated by a hydraulic pump which is preferably electrically driven. However, a pressure fluid accumulator which is constantly recharged by a hydraulic pump may also be used as a pressure fluid source. In the absence of a pressure fluid source of this type having its own energy supply, the pressure impact may also be generated by a pressure converter which is operable by the driver by way of a hand lever or foot pedal.

In order to introduce the so produced pressure pulse into the hydraulic lines provided for service brake operations, a change-over valve connects the pressure fluid source, which is used to generate the pressure impact, to the hydraulic lines. A change-over valve of this type is preferably electrically operable so that the parking brake can be applied by an electric pulse.

An auxiliary device is recommended in the case that no pressure impact to release the parking brake is available during malfunction in the brake system. The locking device can be released without a pressure pulse by additional mechanical means. Thus, additional problems involved with power failure can be avoided, especially in the event of an electrically operable parking brake.

One embodiment of the present invention will be explained in detail hereinbelow, making reference to the accompanying drawings.

DETAILED DESCRIPTION OF THE DRAWINGS

Figure 1:
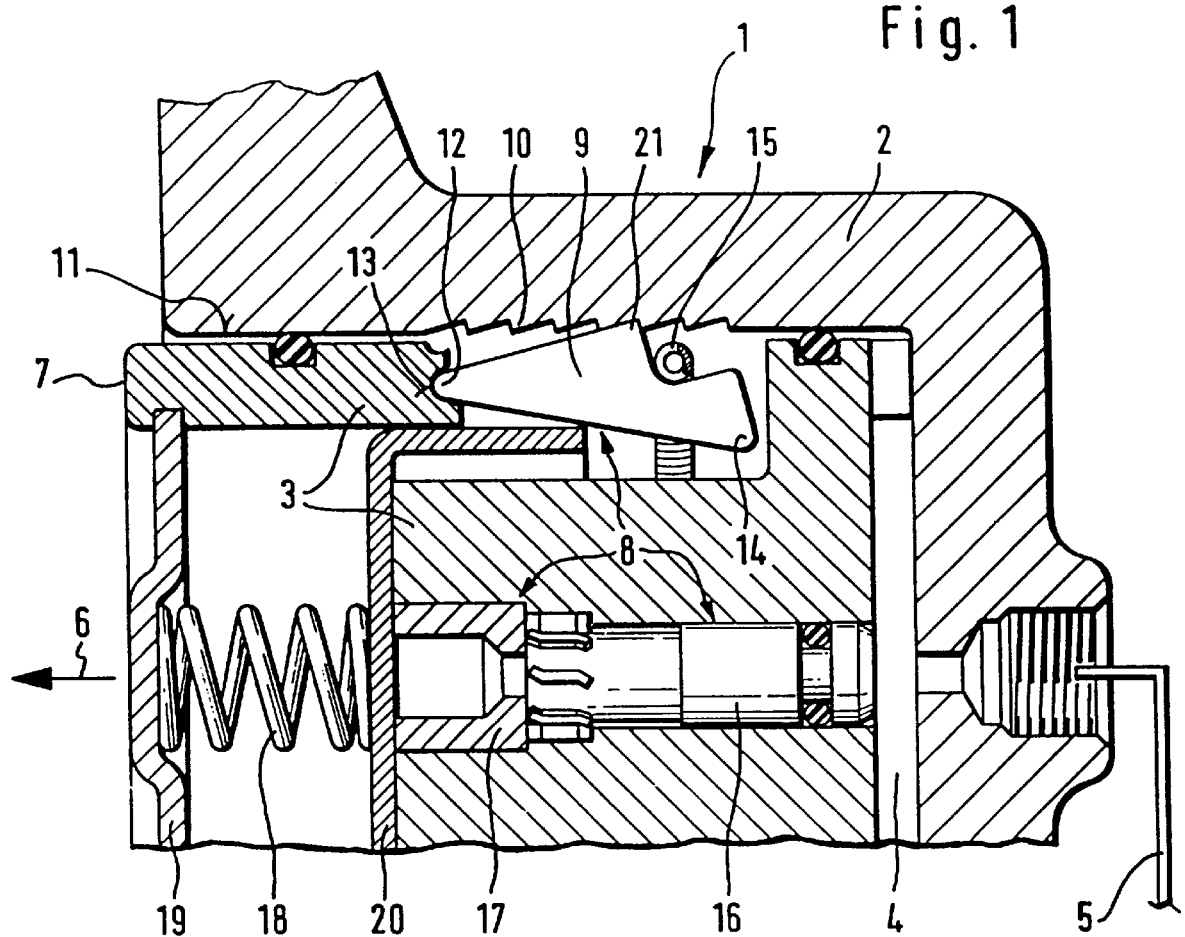
FIG. 1 is a cross-sectional partial view of a combined service and parking brake of the present invention in the locked condition.
Figure 2:
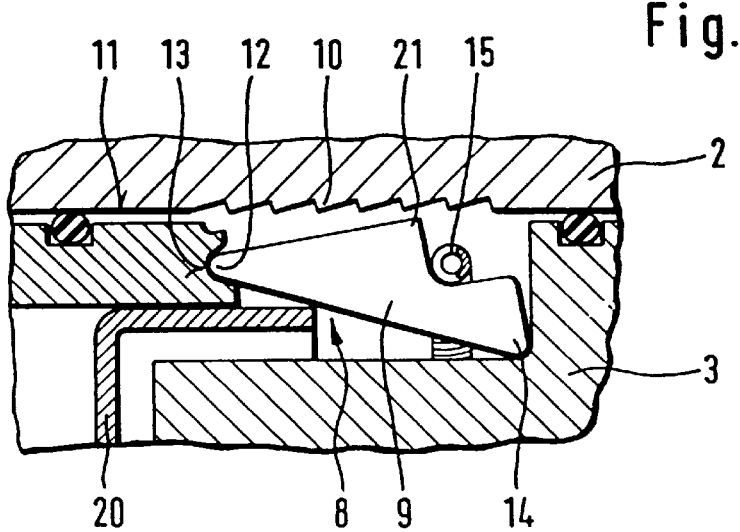
FIG. 2 is a sectional view of the same brake in the released condition.

A combined service and parking brake according to the present invention includes a hydraulic actuating device 1 having a brake cylinder 2 and a brake piston 3, as shown in the drawings. In a service brake operation, the interior 4 of the brake cylinder 2 is subjected to hydraulic pressure by way of a hydraulic supply line 5 until the pressurized brake piston 3 is moved out of the brake cylinder 2 in an axial direction 6 to press with its end surface 7 against a brake shoe (not shown) and urge it against a brake disc (not shown). The illustrated hydraulic actuating device 1 is intended for use in a disc brake and, as a component of a brake caliper, is appropriate along with a brake caliper to press two brake shoes against the opposing axial sides of the brake disc and to thereby clamp them.

Principally, the present invention also permits an embodiment for a drum brake, which is not shown, however.

The illustrated brake further includes a hydraulically operable locking device 8 for locking the brake piston 3 in the applied condition. According to the present invention, the locking device 8 is operable by a pressure impact introduced by way of the hydraulic supply line 5. The pressure impact is in a pressure range that is above the pressure range provided for service brake operations. In the embodiment shown, a pressure range from 0 to 150 bar is provided for service brake operations and a pressure impact in the range of more than 200 bar is provided for the operation of the locking device 8.

The locking device 8 has mechanical locking means for locking engagement of the brake piston 3 relative to the brake cylinder 2. The locking means comprise latches 9 adapted to be engaged in an internal toothing 10 of the brake cylinder bore 11. The latches 9 are distributed over the periphery of the brake piston 3 and are so arranged that they can be lowered into the piston body. The latches 9 have a first acute end 12 which is pivoted in an indentation 13 of the brake piston 3 and a second end 14 which is elastically biassed by a spring 15 in the direction of the brake piston axis (direction of release). Further, the locking device 8 has a hydraulic auxiliary piston 16 which acts upon a mechanical accumulator 17. The mechanical accumulator 17 can store two different operating conditions. One operating condition causes locking engagement of the latches 9, and the other one causes disengagement of the latches 9. The locking device 8 further includes a resetting spring 18 which, with its one end, is supported in an axial direction 6 on a piston bottom 19 and, with its other end, is supported in the opposite direction on the mechanical accumulator 17. A bowl-shaped transmission element 20 transmits an axial movement of the mechanical accumulator 17 to the latches 9.

The locking device 8 operates as follows:

Hydraulic fluid is pressed into the interior 4 of the brake cylinder 2 through the hydraulic supply line 5. As in a service brake operation, the brake piston 3 is moved in an axial direction 6, and the brake shoes are applied. When the actuating pressure for the locking device 8 in the range of more than 200 bar is reached, the auxiliary piston 16 starts to move in the axial direction 6 and displaces part of the mechanical accumulator 17 until a change-over position. The mechanical accumulator 17 will have changed over at the end of the pressure impact and now releases the movement in opposition to the direction 6. The auxiliary piston 16 is returned by the resetting spring 18 along with the transmission element into its initial position, in opposition to the direction 6. The transmission element 20, by the action of the resetting spring 18, pushes with its radially outward edge the latches 9 in a radially outward direction until the detents 21 engage into the internal toothing 10 in the brake cylinder bore 11. Now the brake piston 3 is locked relative to the brake cylinder 2, and the brake is fixed in position in its applied condition. The hydraulic pressure in the interior 4 and in the hydraulic supply line may now drop completely without release of the brake.

To release the brake, hydraulic pressure is conducted through the supply line 5 into the interior 4 of the brake cylinder 2. Initially, the brake piston 3 is acted upon by pressure until the latches 9 are removed from load with respect to the internal toothing 10. Further increase of the hydraulic pressure causes a repeated actuation of the auxiliary piston 16 which, in turn, moves in opposition to the force of the resetting spring 18 in the axial direction 6 and, in doing so, displaces the transmission element 20 in the same direction 6 by way of the mechanical accumulator. When the transmission element 20 is displaced, the untensioned latches 9 will return to their release position by the action of the spring 15, in a radial movement in the direction of the piston axis. In this period of operation, again the mechanical accumulator 18 changes over to its release condition so that it retains the transmission element 20, after the end of the pressure impact, in the release position in opposition to the force of the resetting spring 18. Further decline of the hydraulic pressure eliminates the clamping force of the brake piston 3, with the result of a complete release of the brake. The mechanical accumulator 17 operates in the way of the ball-point pen principle, as explained hereinabove.

The pressure impact required for the operation of the locking device 8 is generated by an electrically driven hydraulic pump (not shown) which is activated by the driver of a vehicle by way of an electric contact. Simultaneously, an electrically actuatable change-over valve (not shown) is actuated to change the hydraulic supply lines 5 of the wheel brakes over from the pressure fluid source provided for service brake operations to the electric pump provided for the operation of the parking brake.

We claim:

1. A combined service and parking brake including a hydraulic actuating device which has at least one brake cylinder and at least one brake piston which is movable in the brake cylinder in service brake operations by being applied with hydraulic pressure from a hydraulic supply line to apply brake pads or brake shoes, and a hydraulically operable locking device for fixing the brake piston in the applied condition, wherein the locking device is operable by a pressure impact through the hydraulic supply line provided for service brake operations, and the pressure impact is in a pressure range that is above the pressure range provided for service brake operations wherein the locking device includes mechanical locking means for locking engagement of the brake piston relative to the brake cylinder wherein the locking device has a hydraulic auxiliary piston for operation of the locking means wherein the locking device has a mechanical accumulator which interacts with the locking means and the auxiliary piston such that the locking means will become engaged by a first pressure impact during a first operation of the auxiliary piston, and the locking means will be disengaged by a second pressure impact during a second operation of the auxiliary piston.

2. The brake as claimed in claim 1, wherein the hydraulic pressure for service brake operations is in the range of below 150 bar and the pressure impact for the operation of the locking device is in the range of more than 200 bar.

3. The brake as claimed in claim 1, wherein the locking means are comprised of latches which are distributed over the periphery of the brake piston and adapted to be lowered into the piston body and which can be locked into an internal toothing in the brake cylinder bore.

4. The brake as claimed in claim 1, wherein the locking means, at the open end of the brake cylinder, are arranged in the area of the end surface of the brake piston.

5. A combined service and parking brake including a hydraulic actuating device which has at least one brake cylinder and at least one brake piston which is movable in the brake cylinder in service brake operations by being applied with hydraulic pressure from a hydraulic supply line to apply brake pads or brake shoes, and a hydraulically operable locking device for fixing the brake piston in the applied condition, wherein the locking device is operable by a pressure impact through the hydraulic supply line provided for service brake operations, and the pressure impact is in a pressure range that is above the pressure range provided for service brake operations wherein the locking device includes mechanical locking means for locking engagement of the brake piston relative to the brake cylinder wherein the locking means are comprised of latches which are distributed over the periphery of the brake piston and adapted to be lowered into the piston body and which can be locked into an internal toothing in the brake cylinder bore.

* * * * *